United States Patent Office
3,439,082
Patented Apr. 15, 1969

3,439,082
PROCESS OF MAKING MOLDED ARTICLES OF A THERMALLY STABLE POLYIMIDE
Jack Lendymore Riley,, Sutton Coldfield, England, assignor to Imperial Chemical Industries Ltd., London, England, a corporation of Great Britain
No Drawing. Filed Nov. 15, 1965, Ser. No. 507,683
Claims priority, application Great Britain, Nov. 25, 1964, 47,977/64
Int. Cl. C07g 3/00; C08g 20/32; B29
U.S. Cl. 264—126   10 Claims

ABSTRACT OF THE DISCLOSURE

A process for making molded articles of a thermally stable polyimide which comprises compacting a polyamic acid powder and heating the compact so formed at a temperature between 250° C. and 400° C. to sinter it and convert the polyamic acid into the polyimide.

The charge to be compacted may consist entirely of unconverted polyamic acid, but preferably it also contains polyimide, and the proportion of polyamic acid can then be quite low, for example 5–30% by weight. The polyamic acid is in powder form, i.e., as particles consisting of polyamic acid (which may be mixed with particles of polyimide) or as particles of polyimide coated with polyamic acid.

The compacting pressure should be chosen so that the compressed charge contains substantially no interstices between the particles. A compacting pressure between 1½ and 6 kg./mm.$^2$ will usually suffice and a pressure of 4½–5 kg./mm.$^2$ is preferred at room temperature.

---

This invention relates to a method of moulding polymeric materials applicable to thermally stable polyimides.

Such compounds commonly comprise condensation products of the anhydride of a polybasic aromatic acid, for example pyromellitic dianhydride, and a diamine, preferably an aromatic diamine. Compared with most other polymers, many polyimides possess unusually good resistance to high temperatures, having softening points in the region of 700° C.

The chemistry of the formation of polyimides is illustrated below for the case of the polypyromellitimides:

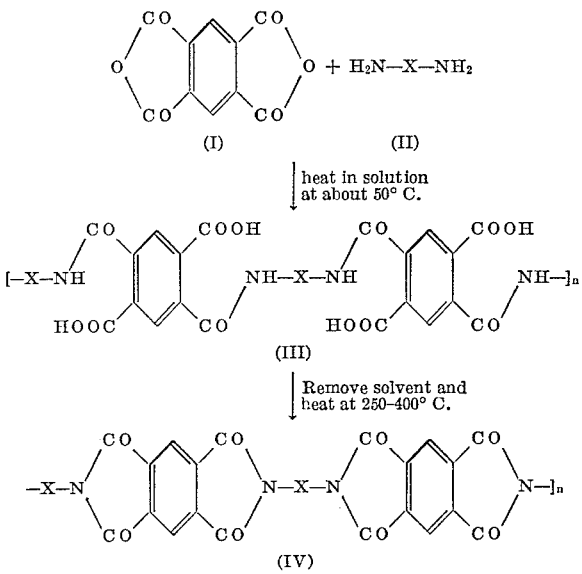

Pyromellitic dianhydride (I) is reacted with a diamine (II), X being a bivalent aliphatic or (preferably) aromatic group. The reaction proceeds in two stages, the first stage being the formation of a soluble polypyromellitamic acid (III, or its positional isomer), the second stage comprising heating this polyamic acid to convert it into an insoluble, thermally stable polypyromellitimide (IV), with an accompanying loss of water.

Since they possess such high melting points, aromatic polyimides such as the polypyromellitimides cannot be moulded by the techniques commonly applied to plastics materials, such as injection moulding. Because of this, they have hitherto been generally used in the form of coating or film-forming solutions. In this technique, a solution of polyamic acid is poured onto a flat surface, or the article to be coated is dipped in such a solution, and the solvent is driven off by heating, leaving a fully polymerised film or coating of polyimide. However, the solution technique is not suitable for the preparation of thick sections or shaped articles.

According to the present invention a process for making moulded articles of a thermally stable polyimide comprises compacting a polyamic acid powder and heating the compact so formed at a temperature between 250° C. and 400° C. to sinter it and convert the polyamic acid into the polyimide.

The charge to be compacted may consist entirely of unconverted polyamic acid, but preferably it also contains polyimide, and the proportion of polyamic acid can then be quite low, for example 5–30% by weight. The polyamic acid is in powder form, i.e. as particles consisting of polyamic acid (which may be mixed with particles of polyimide) or as particles of polyimide coated with polyamic acid.

The compacting pressure should be chosen so that the compressed charge contains substantially no interstices between the particles. A compacting pressure between 1½ and 6 kg./mm.$^2$ will usually suffice and a pressure of 4½–5 kg./mm.$^2$ is preferred at room temperature.

Sintering, in the context of this specification, means heating a compacted mass of a substance in powder form to convert it into a rigid article without extensive melting of the substance. The polyamic acids with which the present invention is concerned are usually converted to high-melting polyimides at their melting points, but the conversion takes place rapidly so that melting of the whole mass of particles does not occur.

Sintering may be effected "free," i.e. at atmospheric pressure, or under an imposed pressure induced for example by a ram. One purpose of this imposed pressure is to enable the water produced during the conversion of polyamic acid to polyimide to be expelled from the compact without producing "blow-holes." The optimum pressure will be dependent on the dimensions of the final product, and may be easily determined in any particular case by simple experiment. It may be less (e.g. by an order of magnitude) than the compacting pressure. For example, when producing articles 12.7 mm. in diameter and 6.35 mm. thick, best results were obtained from particles of polypyromellitamic acid using an applied pressure between 1.4 and 2.1 kg./cm.$^2$ during sintering.

It has been found that more uniform products having an improved freedom from internal discontinuities may be produced if the particles of polyamic acid when used alone are pretreated by heating at a temperature well below the melting point. The pretreatment is preferably carried out before compacting, at a temperature between 60° C. and 100° C. in vacuo; heating in air tends to produce a less uniform and slightly discoloured product. The exact mechanism of this pretreatment is not fully understood, but it is possible that it acts as a drying step or may even effect a partial conversion of the polyamic acid into polyimide.

When polyamic acid powders are desired that also contain polyimide, these may be obtained for example by coating particles of polyimide from a solution of polyamic acid and drying to give a powder comprising particles with a core of polyimide and a coating of polyamic acid suitable for moulding according to the invention. Other methods that may be used include intimate mixing of particles of the two polymers. Sufficient polyamic acid should be used to occupy the interstices between the particles of polyimide after compression so that the latter are strongly cemented together in sintering.

In order that the invention may be more fully understood, a specific experiment will be described, by way of example only:

A charge of a powdered polyamic acid, obtained by condensing pyromellitic dianhydride with bis-(4-aminophenyl) ether, was heated at 80° C. in vacuo for 5 hours, placed in a cylindrical mould of 12.7 mm. internal diameter, and compressed at a pressure of 4.7 kg./mm.$^2$ by a cylindrical ram, which was a sliding fit in the mould, to form a compact 6.35 mm. thick. The compact, mould and ram were then placed in an oven at 350° C. for one hour to sinter the compact and convert it to the polypromellitimide, an imposed pressure of 1.75 kg./cm.$^2$ being maintained on the compact by the ram during the heating.

The physical properties of the cylindrical disc produced by this experiment were then measured. They are compared with published figures for polytetrafluoroethylene and nylon 66 in Tables I and II below:

TABLE I

| Physical Property | Polypyromellitimide | Polytetrafluoroethylene | Nylon 66 |
| --- | --- | --- | --- |
| Density (g./cm.$^3$) | 1.08 | .220 | 1.14 |
| Tensile strength (kg./mm.$^2$) | [1] 4.9 | 1.4 | 7.0 |
| Vickers hardness (5 g. load) | 12 | -------------- | 7 |

[1] This value is approximate, because of the small size of specimen available.

TABLE II

| Material | Pressure (kg./cm.$^2$) | Temperature, ° C. | Deformation, percent on diameter [1] |
| --- | --- | --- | --- |
| Polypyromellitimide | 7 | 300 | 0 |
|  | 7 | 350 | 0 |
|  | 7 | 400 | +5 |
| Polytetrafluoroethylene | 3.2 | 300 | +5 |
|  | 7 | 300 | +20 |
| Nylon 66 | 7 | 200 | +5 |
|  | 7 | 230 | +50 |

[1] Results obtained after 1½ hours under load.

I claim:
1. A process of making moulded articles of a thermally stable polyimide which comprises compacting a polyamic acid powder containing at least 5% polyamic acid balance polyimide and thereafter heating the compact so formed at a temperature between 250° C. and 400° C. under a pressure up to about 0.15 kg./mm.$^2$ to sinter it and convert the polyamic acid into polyimide.
2. A method according to claim 1, in which the compact is sintered under an imposed pressure.
3. A method according to claim 1, in which the polyamic acid powder is compacted at a pressure between 1½ and 6 kg./mm.$^2$.
4. A method according to claim 1, in which the polyamic acid powder is heated before compacting at a temperature between 60° C. and 100° C. in vacuo.
5. A method according to claim 1, in which the polyamic acid is a polypyromellitamic acid.
6. A method according to claim 1, in which the polyamic acid comprises aromatic diamine residues.
7. A method according to claim 1, in which the polyamic acid powder also contains polyimide.
8. A method according to claim 7 in which the polyamic acid powder is a mixture of particles of polyamic acid and particles of polyimide.
9. A method according to claim 7 in which the polyamic acid powder comprises particles with a core of polyimide and a coating of polyamic acid.
10. A method according to claim 1 in which the compact is heated under a pressure up to about 0.021 kg./mm.$^2$.

References Cited

UNITED STATES PATENTS

| | | | |
| --- | --- | --- | --- |
| 3,021,567 | 2/1962 | Ranalli | 264—126 X |
| 3,179,631 | 4/1965 | Endrey. | |
| 3,179,632 | 4/1965 | Hendrix. | |
| 3,179,631 | 4/1965 | Endrey. | |
| 3,340,325 | 9/1967 | Suffredini | 264—126 X |
| 2,695,425 | 11/1954 | Stott | 264—126 X |
| 3,027,626 | 4/1962 | Murphy | 264—118 X |

ROBERT F. WHITE, *Primary Examiner.*

K. J. HOVET, *Assitant Examiner.*

U.S. Cl. X.R.

260—78; 264—330